(12) United States Patent
Belharouak et al.

(10) Patent No.: US 7,465,520 B2
(45) Date of Patent: Dec. 16, 2008

(54) NICKEL-TITANIUM-PHOSPHATE CATHODES

(75) Inventors: Ilias Belharouak, Westmont, IL (US); Khalil Amine, Downers Grove, IL (US)

(73) Assignee: UChicago Argonne LLC, Chicago, IL (US)

(*) Notice: Subject to any disclaimer, the term of this patent is extended or adjusted under 35 U.S.C. 154(b) by 960 days.

(21) Appl. No.: 10/858,806

(22) Filed: Jun. 2, 2004

(65) Prior Publication Data

US 2004/0265696 A1 Dec. 30, 2004

Related U.S. Application Data

(60) Provisional application No. 60/482,757, filed on Jun. 25, 2003.

(51) Int. Cl.
| | |
|---|---|
| H01M 4/58 | (2006.01) |
| H01M 4/48 | (2006.01) |
| H01M 4/56 | (2006.01) |
| C01B 25/26 | (2006.01) |
| C01B 25/30 | (2006.01) |
| C01B 33/32 | (2006.01) |
| C01G 39/00 | (2006.01) |
| C01G 39/02 | (2006.01) |

(52) U.S. Cl. ............... 429/231.95; 429/218.1; 429/231.5; 429/225; 423/311; 423/332; 423/606; 423/608

(58) Field of Classification Search ........... 429/231.5, 429/231.6, 231.95, 218.1, 225; 423/311, 423/332, 606, 608
See application file for complete search history.

(56) References Cited

OTHER PUBLICATIONS

A. El Jazouli et al., Preparation and Structural Characterization of Two New Titanium Phosphates $NaCa_{0.5}Ti(PO_4)_3$ and $Ni_{0.5}TiOPO_4$, Ann. Chim. Sci. Mat, 1998, 23, pp. 7-10.

P. Gravereau et al., Ab Initio Determination and Rietveld Refinement of the Crystal Structure of $Ni_{0.50}TiO(PO_4)$, Powder Diffr., Mar. 1999, pp. 10-15, vol. 14.

*Primary Examiner*—Alexa D Neckel
*Assistant Examiner*—Claire L Rademaker
(74) *Attorney, Agent, or Firm*—Foley & Lardner LLP

(57) ABSTRACT

Cathode materials having an improved electronic conductivity allowing for faster kinetics in the electrochemical reaction, as well as higher conductivity to meet the power requirements for many consumer applications, especially at low temperatures. The cathode material comprises a compound from the family of compounds where the basic unit is generally represented by $Li_xNi_{0.5}TiOPO_4$. The structure of $Li_xNi_{0.5}TiOPO_4$ includes corner sharing octahedra $[TiO_6]$ running along the C-axis. The structure is such that nearly three Li atoms are being inserted in $Li_xNi_{0.5}TiOPO_4$. A cell in accordance with the principles of the present invention is rechargable and demonstrates a high capacity of lithium intercalation and fast kinetics.

19 Claims, 5 Drawing Sheets

NICKEL-TITANIUM-PHOSPHATE CATHODES

CROSS REFERENCE TO RELATED APPLICATIONS

This application is related to and claims priority from U.S. Provisional Patent Application 60/482,757 filed Jun. 25, 2003 which is hereby incorporated by reference.

The United States Government has certain rights in this invention pursuant to Contract No. W-31-109-ENG-38 between the U.S. Department of Energy and The University of Chicago operating Argonne National Laboratories.

FIELD OF THE INVENTION

The present invention relates to cathode materials. More particularly, the present invention relates to nickel-titanium-phosphate cathode materials for lithium ion batteries.

BACKGROUND OF THE INVENTION

Current lithium-ion batteries, or cells, use a solid reductant as the anode and a solid oxidant as the cathode. Solid-state, high energy-density batteries use metallic lithium as the anode. Lithium metal is a preferred anode material as a result of its superior thermodynamic and kinetic properties. In addition, lithium is a good conductor of electricity and heat. Furthermore, lithium's malleability and ductility make it an excellent metal with which to work. However, lithium has well-known drawbacks when used as an anode material. For example, lithium is very reactive and often creates inflammability concerns.

A battery consists of three basic parts—two electrodes (a cathode and anode) separated by an electrolyte. Lithium ion batteries use host materials for the electrodes (for example, carbon as the anode and lithium cobalt oxide as the cathode) to avoid using metallic lithium, thereby improving safety. Electrochemical reactions at the electrodes produce an electric current that powers an external circuit. When the battery is discharged, the anode supplies $Li^+$ ions to the $Li^+$ ion electrolyte and electrons to the external circuit. The cathode is typically an electronically conducting host into which $Li^+$ ions are inserted reversibly from the electrolyte as a guest species and are charge-compensated by electrons from the external circuit. During charge and discharge of lithium ion rechargeable batteries, lithium ions are shuttled between the cathode and anode host materials in a "rocking horse" fashion. Primary batteries or cells are those in which the chemical reaction supplying the electrons is not reversible with respect to the closed universe of the battery. A secondary battery, or cell, utilizes a reaction which can be reversed when current is applied to the battery, thus "recharging" the battery. The chemical reactions at the anode and cathode of a lithium secondary battery must be reversible. On charge, the removal of electrons from the cathode by an external field releases $Li^+$ ions back to the electrolyte to restore the parent host structure, and the addition of electrons to the anode by the external field attracts charge-compensating $Li^+$ ions back into the anode to restore it to its original composition.

A polar aprotic solvent is typically used as the liquid electrolyte solvent in lithium batteries. Aprotic solvents are used due to the absence of labile hydrogen atoms, which would react with lithium to release hydrogen. Polar solvents are those having a strong dipole moment in the molecule. They are used both because they have substantial solvation energies for the electrolyte salt which results in better salt dissolution of the salt, and because they have a higher dielectric constant for the solvent, i.e., better ionic dissociation.

Common solvents that have been used in lithium batteries either in pure form or in solvent mixtures include but are not limited to propylene carbonate ("PC"), ethylene carbonate ("EC"), diethyl carbonate ("DEC"), 1,2-dimethoxyethane, and methylformate. These solvents provide the necessary conductivity in the lithium-ion cell.

There are at least two detrimental effects that stem from the reaction of the lithium with the electrolyte: (1) the exothermic liberation of heat and (2) the formation of a passivating film on the anode's surface. The exothermic release of energy is a problem because an explosive release of energy and reactive materials can result, thus creating a hazard for both the operator and the device that is being powered by the battery. This release of heat often occurs when primary batteries are subjected to temperatures above the recommended levels or when secondary cells are subjected to unusual or severe conditions of recharging. Primary lithium cells using, for example, a lithium thionylchloride system, have been known to undergo high exothermic reactions when subjected to temperatures above or below the recommended temperatures. In the case of secondary cells, subjecting the cells to unusual or severe recharging conditions and deposition of lithium in a highly porous film on the anode have led to similar disastrous results.

Furthermore and as previously mentioned, a dendritic layer will form in the cell. Due to the intrinsic reactivity of lithium toward the electrolyte, the lithium in secondary cells will deposit to form a dendritic layer, which enhances the reactivity of lithium. This formation of passive films on lithium has been shown to be one reason for the loss of capacity of lithium cells on repeated cycling. The film can isolate the anode from the electrolyte, thereby providing a high impedance path and a degradation in cell performance. In addition, lithium metal tends to "deposit out" on the surface of the film rather than on the lithium anode; the deposited lithium is electrically isolated from the anode and is unavailable for later discharges.

The problem of lithium reactivity toward the electrolyte has been addressed in various ways. One approach is to use a carbon intercalation compound such as $LiC^6$ or $LiC^{12}$ with either a liquid or polymeric electrolyte. One disadvantage of this approach is the loss of capacity density.

Interest in phosphate compounds as insertion materials for lithium-ion batteries has led to a large number of studies. One example of these phosphates has the formula of $NaZr_2(PO_4)_3$ which is the basic member of a large family called Nasicon (Na super-ionic conductor). The first intercalation reactions were found in $LiTi_2(PO_4)_3$ and $NaZr_2(PO_4)_3$ having a similar structural arrangement.

Although these compounds have a high capacity of lithium intercalation, the kinetics of the electrochemical reaction are very slow, which is caused in large part by their poor electronic conductivity. The inherent drawbacks of lithium metal resulted in a concerted effort to formulate alternative anodes, cathodes, and or electrolytes that could produce a battery having the improved performance profile of a lithium-ion batter without the environmental, economic, and safety concerns. Much of the cathode research has focused on finding a cheaper substitute for the traditional cathodes such as $LiCo_2O_2$. In addition, there is a need for cathode materials that have a better electronic conductivity allowing for faster kinetics in the electrochemical reaction. Improved liquid organic electrolytes with higher conductivities than these solvents are needed to meet the power requirements for many consumer applications, especially at low temperatures.

SUMMARY OF THE INVENTION

The cathode materials in accordance with the present invention have a better electronic conductivity, allowing for faster kinetics in the electrochemical reaction, as well as higher conductivity to meet the power requirements for many consumer applications, especially at low temperatures. In accordance with the principles of the present invention, a cathode material comprises a compound from the family of compounds where the basic unit is generally represented by $Ni_{0.5}TiOPO_4$. The structure of $Ni_{0.5}TiOPO_4$ can be described, in general, as consisting of a corner sharing octahedra $[TiO_6]$ running along the C-axis. These chains are linked by $[PO_4]$ tetrahedra to form the $[TiPO_5]$ framework. The isolated octahedra sites, between two faces of two $[TiO_6]$, are occupied by nickel atoms. A projection of the structure is shown in FIG. 1. The structure is such that nearly three lithium atoms are being inserted in $Ni_{0.5}TiOPO_4$. A cell constructed in accordance with the principles of the present invention is rechargeable and demonstrates a high capacity of lithium intercalation and fast kinetics.

DETAILED DESCRIPTION OF THE INVENTION

The present invention relates to cathode material having a phase with 3d filled orbital constituents, for example, including but not limited to, $Ni^{2+}$, $Fe^{2+}$, $Mn^{2+}$, $Co^{2+}$, and 3d empty constituents for example, including but not limited to, $Ti^{4+}$. Specifically, the material comprises a new family of phosphate cathodes where the basic unit is represented by $Ni_{0.5}TiOPO_4$.

Figure 1:
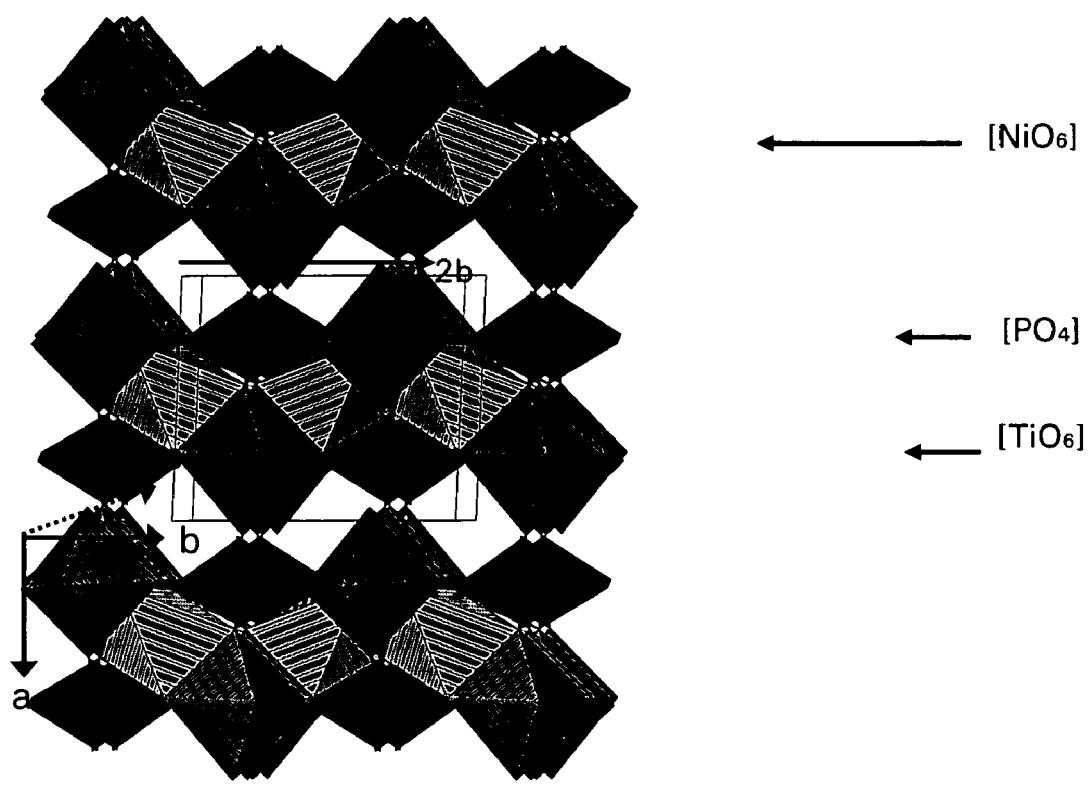
FIG. 1 shows the structure of $Ni_{0.5}TiOPO_4$ showing free tunnels where lithium atoms can be inserted.

The structure of $Ni_{0.5}TiOPO_4$ can be described, in general, as consisting of corner sharing octahedra $[TiO_6]$ running along the C-axis. These chains are linked by $[PO_4]$ tetrahedra to form the $[TiPO_5]$ framework. The isolated octahedra sites, between two faces of two $[TiO_6]$, are occupied by Ni atoms. A projection of the structure is shown in FIG. 1. A close examination of this structure-type shows that this compound has an interstitial space that is favorable for accommodating additional lithium and thus acts as an electrode for lithium batteries. FIG. 1 clearly shows that within the structure of $Ni_{0.5}TiOPO_4$, vacant octahedra (2b site) form a tunnel that would allow lithium-ion insertion and diffusion.

Figure 2:
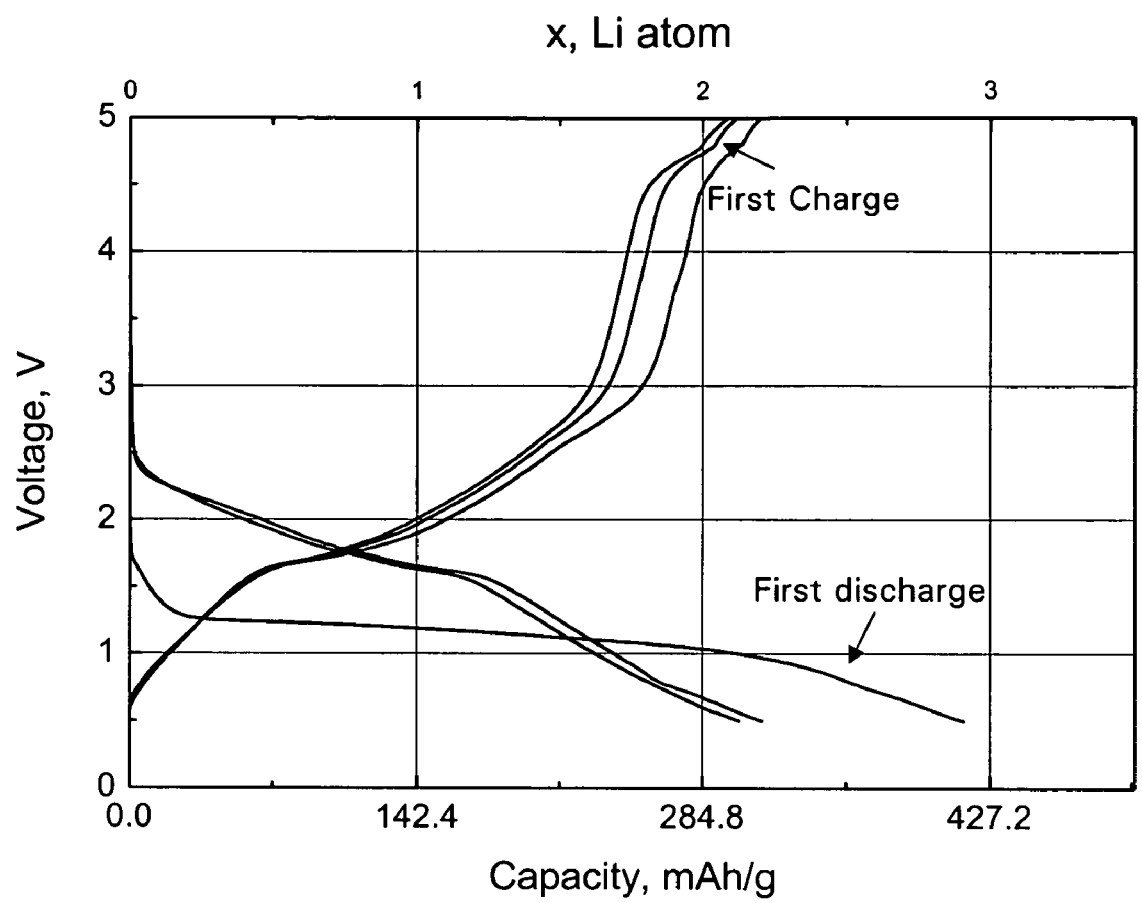
FIG. 2 is a graph of voltage profile vs. the capacity of $Ni_{0.5}TiOPO_4$.

FIG. 2 shows a typical voltage profile of a lithium cell with $Ni_{0.5}TiOPO_4$ cathode. The first discharge occurs between 1.2 and 0.5 V where almost three lithium atoms are inserted within the structure of $Ni_{0.5}TiOPO_4$. The profile of the first discharge shows that lithium insertion occurs as a two-phase reaction that involves the reduction of available $Ti^{4+}$ to $Ti^{3+}$ cations. If all the $Ti^{4+}$ ions could be reduced to $Ti^{3+}$, then the $Ni_{0.5}TiOPO_4$ electrodes would provide a theoretical capacity of 142 mAh/g, which corresponds to the insertion of one lithium atom. However, the experiment shows that approximately 300% of the theoretical capacity is delivered on the initial discharge at a rate of C/15. This would suggest that three Li atoms are being inserted in $Ni_{0.5}TiOPO_4$. The profile of the first charge is completely different from the profile of the first discharge (see FIG. 2).

Figure 3:
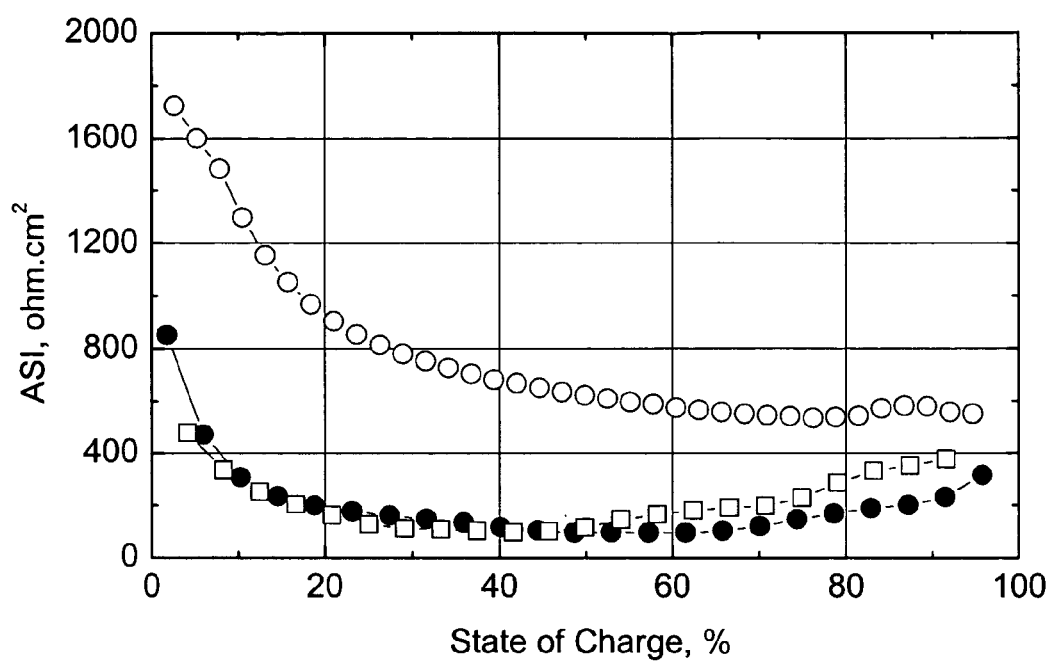
FIG. 3 is a graph of area specific impedance (ASI) vs. the state of charge (SOC) of $Li/Ni_{0.5}TiOPO_4$ battery (ooo) first discharge, (●●●) first charge, (□□□) second discharge.
Figure 4:
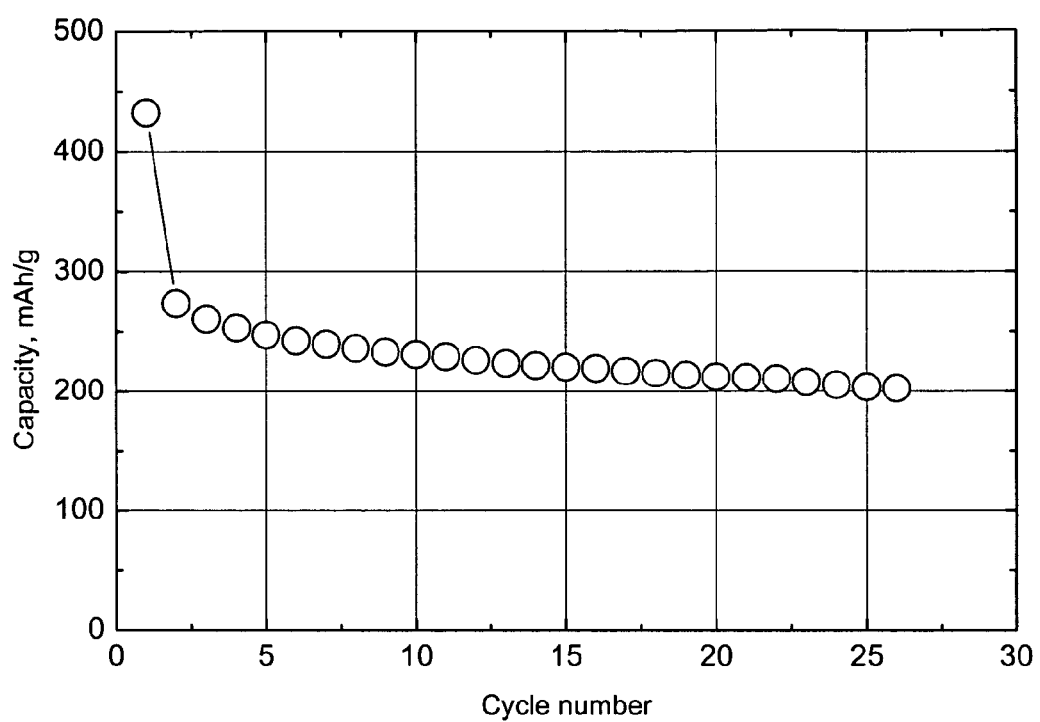
FIG. 4 is a graph of the discharge capacity of $Li/Ni_{0.5}TiOPO_4$ battery at C/12.

One non-limiting view suggests that instead of oxidizing $Ti^{3+}$ to $Ti^{4+}$ in a reversible way during the first charge, the electrochemical reaction implies the divalent active $Ni^{2+}$ cations could be oxidized to $Ni^{3+}$ cations. The redox process that occurs in $Ni_{0.5}TiOPO_4$ electrode during the first charge provides a mixed-valence character to the electrode that significantly improves the electronic conductivity of $Ni_{0.5}TiOPO_4$ electrodes throughout charge and discharge. FIG. 3 illustrates the area specific impedance "ASI" drop after the first discharge which may correspond to the reduction of $Ti^{4+}$ to $Ti^{3+}$. The high charge/discharge capacity is likely caused by a structural rearrangement of $Ni_{0.5}TiOPO_4$, which would transform to a structure that has a large available cavities to accommodate the lithium ions during the cycling processes. Therefore, the area specific impedance (ASI) of the battery significantly decreases during the first charge when compared to the ASI's values of the first discharge (see FIG. 3). The cell performance, with significant cycling stability for 30 cycles, is shown in FIG. 4.

In one embodiment, the insertion material for non-aqueous lithium ion batteries comprises a positive material coating a substrate selected from the group consisting of conductive metals, carbon and mixture thereof. The positive material comprises $Li_xA_{0.5-y}A'_yB_{1-z}B'_zC_{1-w}C'_wO_{5-t}D'_t$; wherein A consists essentially of a metal transition ion, A' is an alkaline ion or a metal transition ion, B is selected from the group consisting of Ti, Zr, Cr, V, Sn, Ge, Pb, Si, Mo, Hf, and any other tetravalent ions, B' is one or more suitable monovalent, divalent, trivalent, tetravalent, heptavalent or hexavalent ions, C is selected from the group consisting of P, As, Sb, V, Nb, Ta, Bi, and W, C' is one or more suitable monovalent, divalent, trivalent, tetravalent, heptavalent or hexavalent ions, D' is selected from the group consisting of F and S; and further wherein $0 \leq x \leq 3$, $0 \leq y \leq 0.5$, $0 \leq z \leq 1$, $0 \leq w \leq 1$, $0 \leq t \leq 1$. The following non-limiting examples illustrate operation of the invention.

EXAMPLE 1

$Ni_{0.5}TiOPO_4$ was synthesized according to the following method. A stoichiometric mixture of NiO, $NH_4H_2PO_4$ and $TiO_2$ was progressively heated at 450° C. for 12 h to allow the integration of the phosphate source. After grinding, the powder was sintered at 950° C. for 24 h. A green fine powder was then obtained and was analyzed by X-ray diffraction (XRD).

A solution of $NiCl_2 \cdot 6H_2O$ or $Ni(NO_3)_2 \cdot 6H_2O$ and $NH_4H_2PO_4$ was slowly added to a solution of $Ti(IV)[OCH(CH_3)_2]_4$ which induces the precipitation of a gel. After drying at 100° C. for 12 h, the resulting powder was progressively heated up to 950° C.

Electrodes were made by coating a paste of $Ni_{0.5}TiOPO_4$ active materials, super-P carbon as a conducting additive, and polyvinylidene fluoride (PVdF) binder (80:10:10 wt %) on a aluminum foil collector. The loading amount of the active material was 4-5 mg/cm². The electrolyte was 1 M $LiPF_6$ in a (1:1 wt %) mixture of ethylene carbonate (EC) and diethyl carbonate (DEC). The cells were assembled inside a helium-filled dry-box and were evaluated using coin-type cells (CR2032:1.6 cm²). The charge/discharge measurements were carried out between 0.5 and 3 potential range at current density of 0.1 mA/cm².

Figure 5:
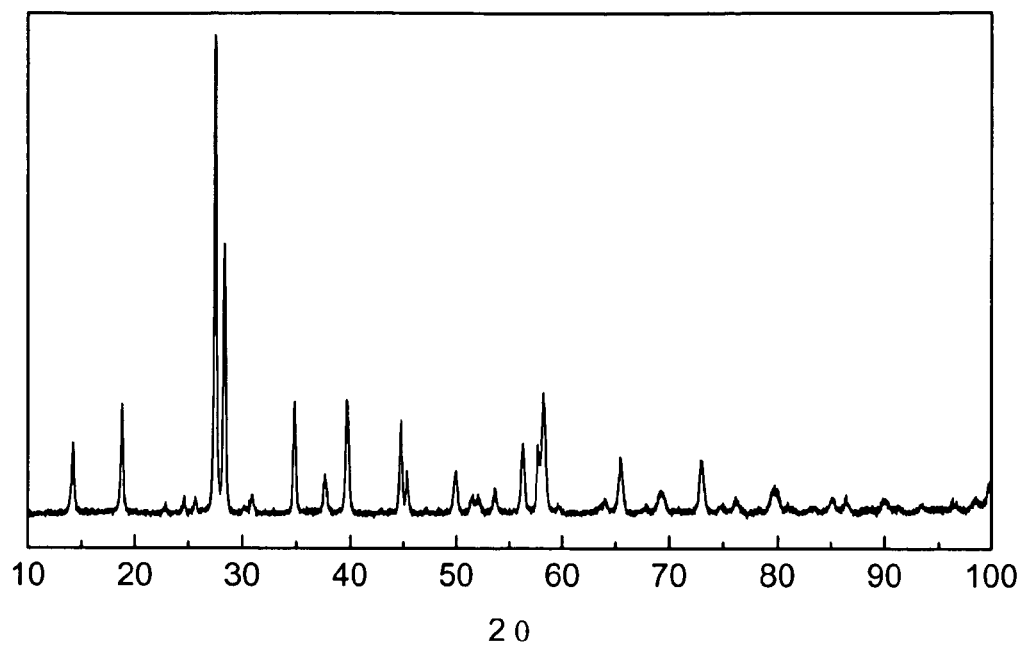
FIG. 5 shows the X-ray diffraction (XRD) patterns of the $Ni_{0.5}TiOPO_4$ compound made at 950° C.

FIG. 5 shows the X-ray diffraction (XRD) patterns of the $Ni_{0.5}TiOPO_4$ compound. The observed lines for both materials were indexed according to a monoclinic unit cell and $P2_1/c$ space group (Z=4). The lattice parameters of $Ni_{0.5}TiOPO_4$ are: a=7.373 Å, b=7.334 Å and c=7.351 Å and β=120.20°. The structure of this compound was established by X-ray diffraction technique, one view of which is shown in FIG. 1.

It should be understood that various changes and modifications preferred in to the embodiment described herein would be apparent to those skilled in the art. Such changes and modifications can be made without departing from the spirit and scope of the present invention and without demising its attendant advantages. It is therefore intended that such changes and modifications be covered by the appended claims.

What is claimed is:

1. An insertion material for non-aqueous lithium ion batteries comprising:
    positive material comprising $Li_xA_{0.5-y}A'_yB_{1-z}B'_zC_{1-w}C'_wO_{5-t}D'_t$; wherein A consists essentially of a metal transition ion, A' is an alkaline ion or a metal transition ion, B is selected from the group consisting of Ti, Zr, Cr, V, Sn, Ge, Pb, Si, Mo, Hf and any other tetravalent ions, B' is one or more suitable monovalent, divalent, trivalent, tetravalent, heptavalent or hexavalent ions, C is selected from the group consisting of P, As, Sb, V, Nb, Ta, Bi, and W, C' is one or more suitable monovalent, divalent, trivalent, tetravalent, heptavalent or hexavalent ions, D' is selected from the group consisting of F and S; and further wherein $0 \leq x \leq 3$, $0 \leq y \leq 0.5$, $0 \leq z \leq 1$, $0 \leq w \leq 1$, $0 \leq t \leq 1$;
    the positive material coating a substrate selected from the group consisting of conductive metals, carbon and mixture thereof.

2. The insertion material of claim 1, wherein $Li_xA_{0.5-y}A'_yB_{1-z}B'_zC_{1-w}C'_wO_{5-t}D'_t$ comprises $Li_xA_{0.5}TiPO_5$ and wherein A consists essentially of a metal transition ion selected from the group consisting of Ni, Fe, Co, Mn, Zn, Cu, and Cr, and wherein $0 \leq x \leq 3$.

3. The insertion material of claim 1, wherein $Li_xA_{0.5-y}A'_yB_{1-z}B'_zC_{1-w}C'_wO_{5-t}D'_t$ comprises $A_{0.5}TiPO_5$ and wherein A is a metal transition ion selected from the group consisting of Ni, Fe, Co, Mn, Zn, Cu, and Cr.

4. An electrochemical device comprising:
    $Li_xA_{0.5-y}A'_yB_{1-z}B'_zC_{1-w}C'_wO_{5-t}D'_t$ wherein A consists essentially of a metal transition ion, A' is an alkaline ion or a metal transition ion, B is selected from the group consisting of Ti, Zr, Cr, V, Sn, Ge, Pb, Si, Mo, Hf and any other tetravalent ions, B' is one or more suitable monovalent, divalent, trivalent, tetravalent, heptavalent or hexavalent ions, C is selected from the group consisting of P, As, Sb, V, Nb, Ta, Bi, and W, C' is one or more suitable monovalent, divalent, trivalent, tetravalent, heptavalent or hexavalent ions, D' is selected from the group consisting of F and S; and wherein $0 \leq x \leq 3$, $0 \leq y \leq 0.5$, $0 \leq z \leq 1$, $0 \leq w \leq 1$, $0 \leq t \leq 1$;
    a negative electrode; and
    a non aqueous electrolyte.

5. A electrochemical device comprising: a positive active material comprising $Li_xA_{0.5-y}A'_yB_{1-z}B'_zC_{1-w}C'_wO_{5-t}D'_t$; wherein A is a metal transition ion, A' is an alkaline ion or a metal transition ion, B is selected from the group consisting of Ti, Zr, Cr, V, Sn, Ge, Pb, Si, Mo, Hf and any other tetravalent ions, B' is one or more suitable monovalent, divalent, trivalent, tetravalent, heptavalent or hexavalent ions, C is selected from the group consisting of P, As, Sb, V, Nb, Ta, Bi, and W, C' is one or more suitable monovalent, divalent, trivalent, tetravalent, heptavalent or hexavalent ions, D' is selected from the group consisting of F and S; and wherein $0 \leq x \leq 3$, $0 \leq y \leq 0.5$, $0 \leq z \leq 1$, $0 \leq w \leq 1$, $0 \leq t \leq 1$;
    a negative electrode; and
    a non aqueous electrolyte.

6. The positive active material of claim 5, wherein the Ni ion is partially replaced by one or more suitable alkaline or metal transition (A') ions to provide an electrode $Li_xNi_{0.5-y}A'_yTiPO_5$, wherein $0 \leq x \leq 3$ and $0 < y < 0.5$.

7. The positive active material of claim 5, wherein the tetravalent Ti ion is partially replaced by one or more suitable monovalent, divalent, trivalent, tetravalent, heptavalent or hexavalent metal (B') ion to provide an electrode $Li_xNi_{0.5}Ti_{1-z}B'_zPO_5$, wherein $0 \leq x \leq 3$ and $0 < z < 1$.

8. The positive active material of claim 5, wherein the pentavalent P ion is partially replaced by one or more suitable monovalent, divalent, trivalent, tetravalent, heptavalent, or hexavalent metal (C') ions to provide an electrode $Li_xNi_{0.5}TiP_{1-w}C'_wO_5$, wherein $0 \leq x \leq 3$ and $0 < w < 1$.

9. The positive active material of claim 5, wherein the O divalent anion is partially replaced by one or more suitable monovalent, and divalent (D') anions to provide an electrode $Li_xNi_{0.5}TiPO_{5-t}D'_t$, wherein $0 \leq x \leq 3$ and $0 < t < 1$.

10. The positive active material of claim 5, wherein the Ni, Ti and P ions are partially replaced by one or more suitable monovalent, divalent, trivalent, tetravalent, heptavalent or hexavalent metal (A'), (B') and (C') cations respectively, to provide an electrode $Li_xNi_{0.5-y}A'_yTi_{1-z}B'_zP_{1-w}C'_wO_5$, wherein $0 \leq x \leq 3$, $0 < y < 0.5$, $0 < z < 1$, $0 < w < 1$.

11. A positive active material of claim 1, wherein $Ti^{4+}$ cations are reduced to $Ti^{3+}$ cations by including the preparation under reducing atmospheres selected from the group consisting of $H_2$, $H_2/N_2$, $CO_2/CO$.

12. The positive active material of claim 5, further comprising a surface coating of the material with a group consisting of conductive metals, carbon and mixture thereof.

13. The positive active material of claim 5, further comprising a surface coating of the material with a conductive metal or metal oxide 14. An electrochemical device comprising the active material of claim 12, an electrolyte and a negative electrode.

15. An electrochemical device comprising the active material of claim 13, an electrolyte and a negative electrode.

16. The electrochemical device of claim 4 wherein the electrolyte is a nonaqueous electrolyte.

17. The electrochemical device of claim 4 wherein the electrolyte comprises a salt dissolved in at least one aprotic solvent selected from the group consisting of linear carbonate, cyclic carbonate and mixtures thereof.

18. The electrochemical device of claim 17 wherein the salt is chosen from the group consisting of $LiClO_4$, $LiPF_6$, $LiBF_4$, $LiAsF_6$, $LiCF_3SO_3$, $Li(CF_3SO_2)_2N$, $Li(CF_3SO_2)_3C$, $LiN(SO_2C_2F_5)_2$, lithium alkyl fuorophosphate, lithium bis(chelato)borates, $LiBC_2O_4F_2$ and mixtures thereof.

19. The electrochemical device of claim 4 wherein said anode comprises a material selected from the group consisting of lithium metal, graphite, other carbon, $Li_4Ti_5O_{12}$, $Cu_6Sn_5$, $Cu_2Sb$, MnSb, silica alloys and mixtures thereof.

* * * * *